(12) United States Patent
Vieth et al.

(10) Patent No.: US 10,265,885 B2
(45) Date of Patent: Apr. 23, 2019

(54) FIBER COMPOSITE AND METHOD FOR ITS MANUFACTURE

(71) Applicant: PHP FIBERS GMBH, Obernburg (DE)

(72) Inventors: Christian Vieth, Worth (DE); Andreas Flachenecker, Essen (DE); Volker Siejak, Duisburg (DE)

(73) Assignee: PHP FIBERS GMBH, Obernburg (DE)

( * ) Notice: Subject to any disclaimer, the term of this patent is extended or adjusted under 35 U.S.C. 154(b) by 1 day.

(21) Appl. No.: 15/110,882

(22) PCT Filed: Dec. 19, 2014

(86) PCT No.: PCT/EP2014/078850
§ 371 (c)(1),
(2) Date: Jul. 11, 2016

(87) PCT Pub. No.: WO2015/104178
PCT Pub. Date: Jul. 16, 2015

(65) Prior Publication Data
US 2016/0318210 A1    Nov. 3, 2016

(30) Foreign Application Priority Data
Jan. 9, 2014    (EP) .................................... 14150631

(51) Int. Cl.
*D02J 1/18*    (2006.01)
*D02G 3/40*    (2006.01)
(Continued)

(52) U.S. Cl.
CPC .............. *B29B 11/16* (2013.01); *B29B 11/12* (2013.01); *B29B 13/06* (2013.01); *B29C 70/22* (2013.01);
(Continued)

(58) Field of Classification Search
CPC .......... B29K 2023/12; B29K 2067/003; B29K 2077/00; B32B 2260/021; B32B 27/12;
(Continued)

(56) References Cited

U.S. PATENT DOCUMENTS 4,874,658 A * 10/1989 Sasaki ..................... B29C 70/16
428/220
5,082,701 A * 1/1992 Craven ..................... B32B 5/00
428/34.5
(Continued)

FOREIGN PATENT DOCUMENTS

DE    102012018801 A1    3/2013
EP    2636783 A1    9/2013
(Continued)

OTHER PUBLICATIONS

Mar. 24, 2015 Written Opinion issued in International Patent Application No. PCT/EP2014/078850.
(Continued)

*Primary Examiner* — Camie S Thompson
(74) *Attorney, Agent, or Firm* — Oliff PLC

(57) ABSTRACT
A fiber composite having one or more layers of reinforcing fibers or filaments, that contains one or more layers of ribbon yarns brought into contact with it, as well as a method for its production.

7 Claims, 1 Drawing Sheet

(51) Int. Cl.
| | |
|---|---|
| *D02G 3/44* | (2006.01) |
| *D02G 3/48* | (2006.01) |
| *D01G 9/00* | (2006.01) |
| *D06B 1/02* | (2006.01) |
| *B29B 11/16* | (2006.01) |
| *B29C 70/46* | (2006.01) |
| *B29C 70/22* | (2006.01) |
| *B29B 11/12* | (2006.01) |
| *B29B 13/06* | (2006.01) |
| *B32B 5/12* | (2006.01) |
| *B32B 27/12* | (2006.01) |
| *B32B 27/34* | (2006.01) |
| *B32B 27/36* | (2006.01) |
| *B29K 23/00* | (2006.01) |
| *B29K 67/00* | (2006.01) |
| *B29K 77/00* | (2006.01) |
| *B29K 105/08* | (2006.01) |
| *B29L 31/30* | (2006.01) |

(52) U.S. Cl.
CPC ............. *B29C 70/465* (2013.01); *B32B 5/12* (2013.01); *B32B 27/12* (2013.01); *B32B 27/34* (2013.01); *B32B 27/36* (2013.01); *B29K 2023/12* (2013.01); *B29K 2067/003* (2013.01); *B29K 2077/00* (2013.01); *B29K 2105/0845* (2013.01); *B29L 2031/30* (2013.01); *B32B 2260/021* (2013.01); *B32B 2260/046* (2013.01); *B32B 2262/10* (2013.01)

(58) Field of Classification Search
CPC ..... B32B 27/34; B32B 27/36; B32B 2262/10; B32B 13/06; B32B 5/12; B60R 2021/23514; D02G 3/402; D02G 3/446; D02G 3/48; D02J 1/18; D04H 3/011; D04H 3/12; D10B 2331/02; D10B 2331/04; D10B 2505/82; D10B 2505/124; Y10T 428/249921; B29C 70/22; B29C 70/465; B29C 70/46; B29B 11/16; B29B 11/12

See application file for complete search history.

(56) References Cited

U.S. PATENT DOCUMENTS

| | | | |
|---|---|---|---|
| 5,445,693 A * | 8/1995 | Vane ..................... | B29C 70/202 156/148 |
| 2003/0203152 A1* | 10/2003 | Higgins ............. | A47G 27/0293 428/92 |
| 2013/0041335 A1* | 2/2013 | Dwiggins ................. | B32B 5/26 604/372 |
| 2013/0149521 A1* | 6/2013 | Nelson .................. | B29C 70/081 428/221 |
| 2015/0044438 A1 | 2/2015 | Baser | |
| 2015/0167207 A1 | 6/2015 | Bongartz et al. | |

FOREIGN PATENT DOCUMENTS

| | | | |
|---|---|---|---|
| WO | 2005/033390 A2 | | 4/2005 |
| WO | WO2012/010805 | * | 1/2012 |
| WO | 2013/117728 A1 | | 8/2013 |

OTHER PUBLICATIONS

Mar. 24, 2015 International Search Report issued in International Patent Application No. PCT/EP2014/078859.

Jan. 30, 2018 Office Action issued in Chinese Patent Application No. 201480072681.0.

* cited by examiner

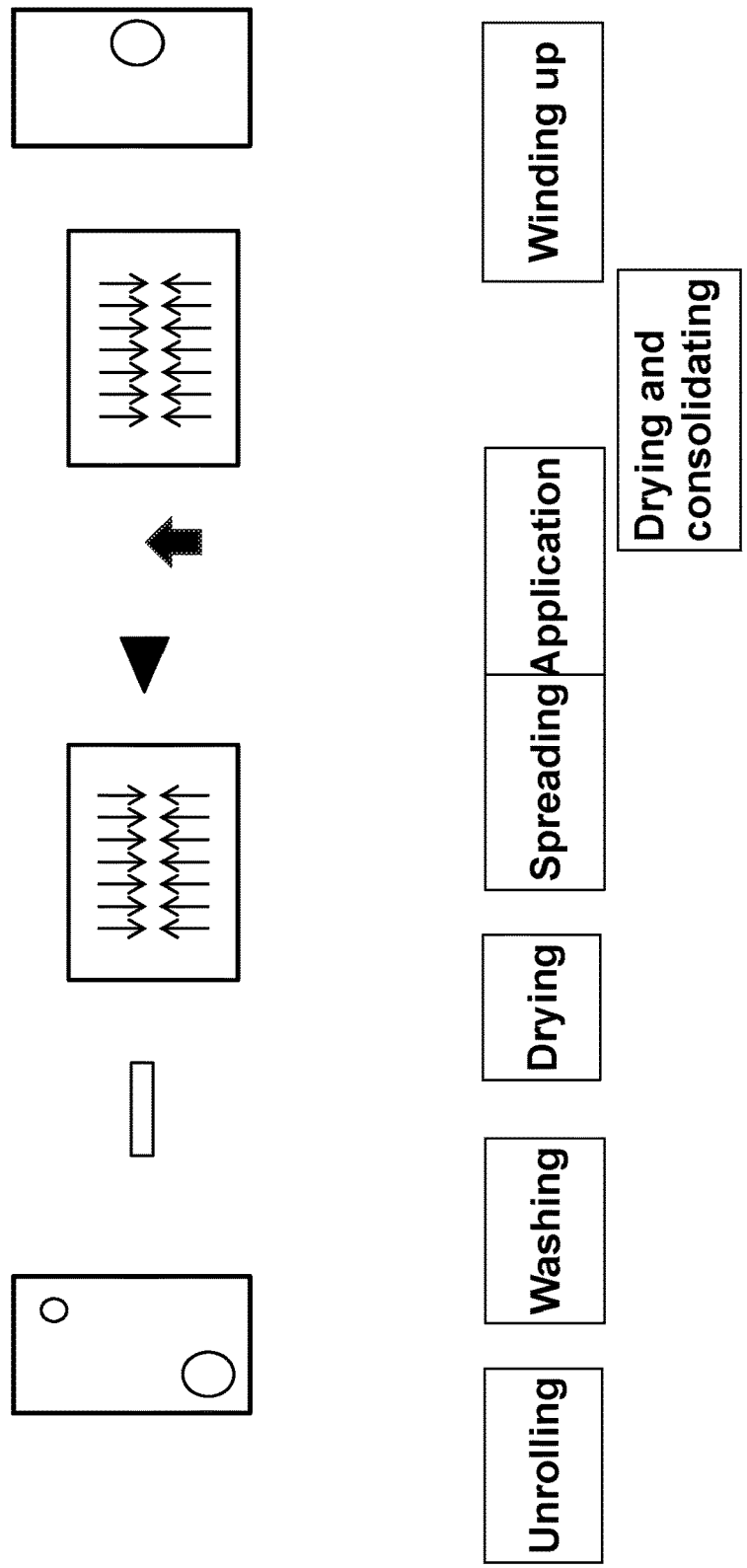

FIBER COMPOSITE AND METHOD FOR ITS MANUFACTURE

BACKGROUND

The present disclosure relates to fiber matrix intermediates (also known as "rovings") and a method for their manufacture. The disclosure is directed in particular to fiber matrix intermediates for the manufacture of fiber composites with a thermoplastic matrix. Products made from these can be e.g., organic sheets that are employed today primarily in automobile and aircraft construction. Further potentials exist in the production of front ends, seats, carriers and pedals.

Organic sheets are fiber matrix intermediates. They consist of a woven fabric or scrim made from continuous fibers, embedded in a thermoplastic matrix. The advantages of a thermoplastic matrix lie in the high automation potential, such as the continuous production and the hot formability of the intermediates, and the resulting short process times compared to conventional thermoset fiber composites. This is of great interest particularly in the automotive industry with its short process times. Fiber materials frequently used here are glass, basalt aramid and carbon. In woven fabrics and scrims, the fibers can also run at right-angles to one another so that the mechanical properties such as rigidity, strength and thermal expansion can be better defined than for their metallic archetypes. In contrast to metal sheets, the tensile and compressive behavior is not symmetrical.

The high-strength thermoplastic fiber composites are generally produced by a bundle of continuous filaments, such as carbon fibers, basalt aramid fibers or glass fibers, first being laid up as reinforcing fibers. A size of matrix material consisting of a thermoplastic adhesive material—such as polyamide resins, aromatic polyamides, thermoplastic polyurethane or polyester—is then applied over and/or under the reinforcing fibers. The matrix material is then melted by the application of heat and possibly pressure in order to obtain the fiber composite. A method of this type is disclosed for example in WO 2005/033390 A2.

Matrix materials of cross-linkable materials and similar materials are naturally also common and generally known per se to a person skilled in the art.

Hybrid fiber composites can also be used as organic sheets, in which, in addition to the reinforcing filaments, further filaments are also inserted to serve as matrix material. The filaments are preferably oriented unidirectionally; this can be achieved e.g., by separating the filaments using suitable guiding devices and yarn guiding units. Here again, a matrix material or fixing agent is finally applied in order to produce the composite thermally or chemically.

The state-of-the-art methods for production of the hybrid fiber composites have the disadvantage that a uniform application of the matrix material is sometimes difficult to achieve. Furthermore, different types of filaments frequently have to be separated or spread, and with the different mechanical properties of these filaments, this can lead to problems.

BRIEF SUMMARY

The present disclosure resolves this problem in that it provides a fiber composite, having one or more layers of reinforcing fibers or filaments, that contains one or more layers of ribbon yarns brought into contact with it.

BRIEF DESCRIPTION OF THE DRAWINGS

FIG. 1 is a schematic showing the production process of ribbon yarns.

DETAILED DESCRIPTION

Within the context of the present disclosure, the term "ribbon yarns" is understood as meaning a spread arrangement of unidirectionally oriented filaments in which the width to thickness ratio is at least 10:1, preferably 50:1, more preferably 40:1 and most preferably 30:1, for example a thickness of 0.2 mm and a width of 6 mm. This arrangement is fixed by means of suitable binders, such as sizes or thermoplastic adhesives.

Materials used for the ribbon yarns are preferably those described in WO2013/117728, the disclosure of which is incorporated by reference. The major advantage of these materials lies in the simple handling, the particularly uniform distribution of the matrix material, the achievement of short consolidation routes and the obtaining of a very uniform product. The ribbon yarns wound up without twisting can, for example, be easily transported and employed on site.

For the described fiber composite, it is preferable that at least one layer of the reinforcing fibers or filaments lies between two layers of ribbon yarns. This sandwich structure results in the formation of very uniform intermediates that can be easily and inexpensively further processed in subsequent steps.

Consequently the ribbon yarns of the disclosed fiber composite preferably contain yarns of polyamide 6, polyamide 6,6, polyamide 4,6 polyester, polyethylene terephthalate, polyphthalamide (PPA) or polypropylene. Such preferred ribbon yarns are sold e.g., under the designation Enka TecTape by PHP Fibers, Obernburg (Germany). Ribbon yarns can naturally also be made from other materials. It is possible, and also preferable, for example, that a ribbon yarn is made from the materials commonly employed as reinforcing fibers or filaments. For example, ribbon yarns can be made from glass multifilament yarn with the filaments also being spread and introduced in the process essentially parallel to one another. These glass multifilaments are expediently fixed using a suitable size and consist preferably of multifilament yarns with a linear density of 12000 dtex f 2000 and are also preferably adhesion-activated. For this reason, the disclosure is also directed at a fiber composite in which the reinforcing fibers or filaments also take the form of ribbon yarns.

Furthermore, the disclosure is directed at a method for production of a fiber composite in which one or more layers of reinforcing fibers or filaments are brought into contact with one or more layers of ribbon yarns.

It is preferable here that the layers of ribbon yarns are unwound from one or more reels. In a further preferred embodiment, the reinforcing filaments themselves also take the form of ribbon yarns.

The fiber composite obtained in this way can then be consolidated thermally and/or under pressure in order to then be further processed as a so-called organic sheet for example.

In a further preferred embodiment, the layers of reinforcing fibers and filaments are twisted together with the layers of the ribbon yarns so that cohesion is possible even without thermal treatment or pressure. This is naturally ideal if all the layers—i.e., including the fibers or filaments forming the reinforcing layers—also take the form of a ribbon yarn.

Furthermore, the fiber composite and production process will be described in more detail using the following examples, whereby these examples should in no way be regarded as limiting the disclosure.

Example 1

Ribbon yarns were produced from polyamide 6 multifilaments with a nominal linear density of 1880 dtex f280, as described in WO 2013/117728. The production comprised the following steps and is also explained by the schematic diagram in the FIGURE:
Unrolling of the yarn
Possibly washing
Drying
Spreading
Application of 5 wt. % of the binder Griltex 2A from EMS-Chemie AG (a copolyamide in aqueous dispersion)
Consolidation of the copolyamide in the kiln at 120° C.
Winding up twist-free Example 2

Example 1 was repeated with the difference that instead of the polyamide 6, a glass multifilament yarn with a linear density of 12000 dtex f 2000 (adhesion-activated) was employed.
Application of 5 wt. % of the binder Griltex 2A from EMS-Chemie AG (a copolyamide in aqueous dispersion) or 2 wt. % of size.

Example 3

The ribbon yarns obtained from the examples above were treated as follows for production of the fiber composite (in this case glass fiber hybrid rovings):
a) 1 layer of polyamide 6 ribbon yarn and 1 layer of glass multifilament ribbon yarn
b) Make-up in layers (3-layer sandwich):
1 layer of polyamide 6 ribbon yarn (top), 1 layer of glass multifilament ribbon yarn (middle) and 1 layer of polyamide 6 ribbon yarn (bottom).
c) Make-up in layers (5-layer double sandwich):
1 layer of polyamide 6 ribbon yarn (top), followed by 1 layer of glass multifilament ribbon yarn and 1 layer of polyamide 6 ribbon yarn, then a further 1 layer of glass multifilament ribbon yarn and finally 1 layer of polyamide 6 ribbon yarn (bottom).
The above glass fiber hybrid ravings are bonded (prefixed) using the copolyamide and/or the size. The resulting rovings are wound up twist-free.
Alternatively the individual layers are only heated up in the kiln at approx. 120° C., causing the copolyamide to melt slightly, and then the layers are consolidated by pressing together using rollers (calenders) and wound up twist-free.

The invention claimed is:
1. A fiber composite comprising one or more layers of reinforcing filaments and one or more layers of ribbon yarns brought into contact with the one or more layers of reinforcing filaments, wherein
the reinforcing filaments are selected from the group consisting of carbon fibers, glass fibers, basalt fibers, aramid fibers, and combinations thereof,
the ribbon yarns are comprised of yarns and a matrix,
the yarns of the ribbon yarns are aliphatic polyamides, aromatic polyamides, polyesters, or polypropylene yarns,
the matrix comprises copolyamides, copolyesters, silicones, and/or mixtures thereof,
the reinforcing filaments do not contain a thermoplastic matrix
the fiber composite is only consolidated thermally and/or under pressure, and
the ribbon yarn is formed by spreading a yarn such that not more than 5 filaments overlie one another, fixing the yarn by forming a matrix, and winding the fixed yarn.
2. The fiber composite according to claim 1, wherein at least one layer of the reinforcing filaments lies between two layers of ribbon yarns.
3. The fiber composite according to claim 1, wherein the aliphatic polyamides are selected from a group comprising polyamide 6, polyamide 6,6, and polyamide 4,6, the aromatic polyamides are PPA, and the polyesters are polyethylene terephthalate.
4. A method for production of a fiber composite, the method comprising bringing one or more layers of reinforcing filaments into contact with one or more layers of ribbon yarns, wherein
the reinforcing filaments are selected from a group comprising carbon fibers, glass fibers, basalt fibers and aramid fibers,
the ribbon yarns are comprised of yarns and a matrix,
the ribbon yarns consist essentially of polyamide 6 or polypropylene yarns,
the matrix comprises copolyamides, copolyesters, silicones, and/or mixtures thereof,
the reinforcing filaments do not contain a thermoplastic matrix,
the fiber composite is subsequently only consolidated thermally and/or under pressure, and
the ribbon yarn is formed by spreading a yarn such that not more than 5 filaments overlie one another, fixing the yarn by forming a matrix, and winding the fixed yarn.
5. The method according to claim 4, wherein in forming the fiber composite the layers of ribbon yarns are unwound twist-free from one or more reels.
6. The method according to claim 4, wherein the reinforcing filaments are also introduced as a ribbon yarn layer.
7. The method according to claim 4, wherein multiple layers of the layers of reinforcing filaments are consolidated by twisting them together.

* * * * *